Sept. 3, 1929.  A. HORTEN  1,726,986
FIELD WATERING PLANT
Filed June 22, 1923
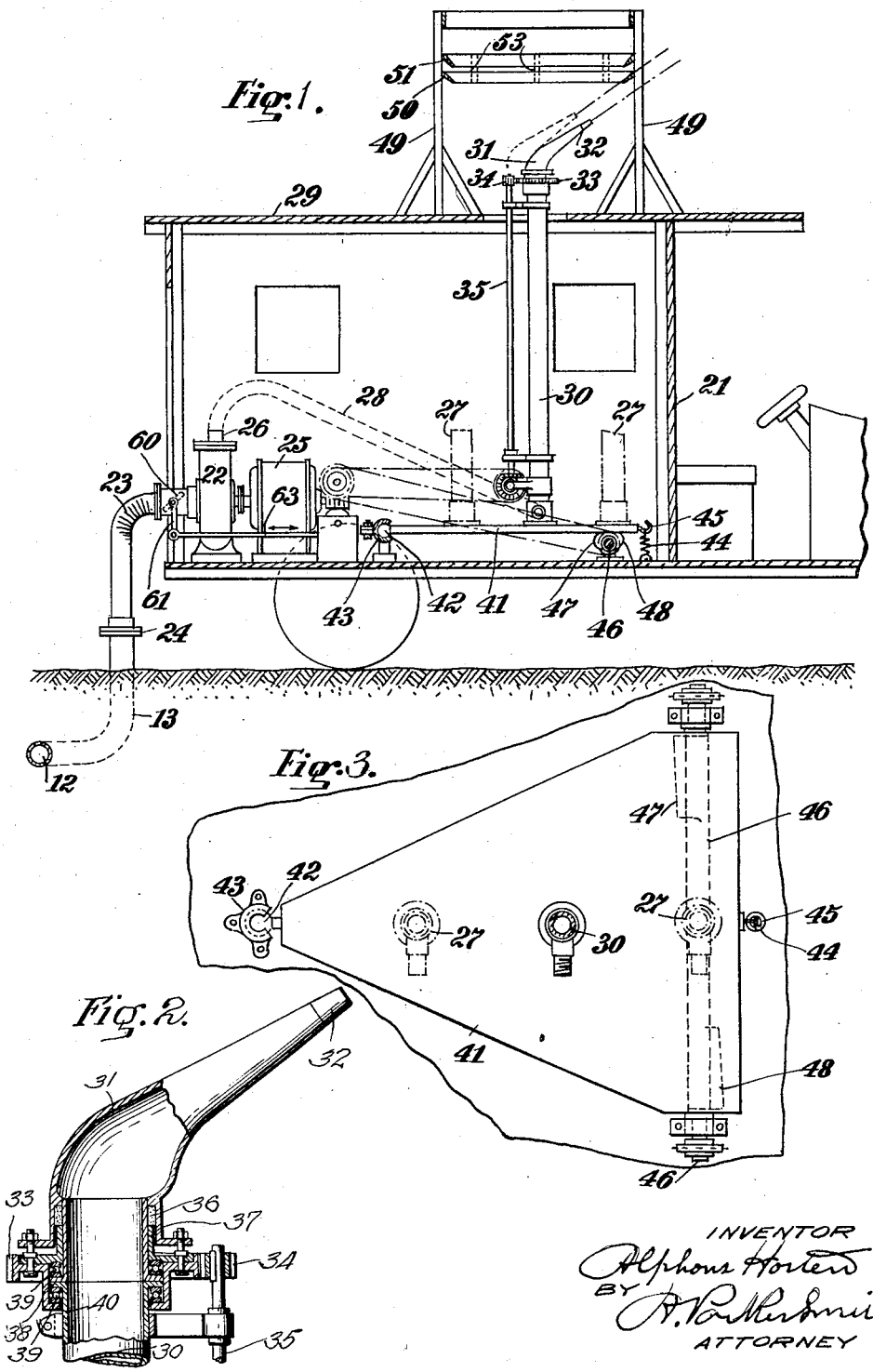
INVENTOR
Alphons Horten
BY
ATTORNEY Patented Sept. 3, 1929.

1,726,986

UNITED STATES PATENT OFFICE.

ALPHONS HORTEN, OF BERLIN, GERMANY.

FIELD WATERING PLANT.

Application filed June 22, 1923, Serial No. 647,127, and in Germany June 24, 1922.

This invention relates to plants for watering fields on a large scale. An important feature of the invention consists in a convenient means for changing the distance to which a jet of water is thrown from the rotating nozzle. This means comprises a jet deflecting member against which the rotating jet impinges. Means are provided for automatically altering the relative horizontal positions of the nozzle and the jet deflecting member. The nozzle is preferably mounted on a vehicle. It may however be transported from one connecting pipe to another in the field by any suitable means.

Other features of the invention will appear in the following description, drawings and claims, The drawings illustrate more or less diagrammatically a field watering plant with its auxiliary devices according to my invention.

Figure 1 illustrates a side view, partly in section, of a vehicular pump connected to an ascension pipe or tap, and the device for ejecting the liquid by means of a rotary oscillatory nozzle.

Fig. 2 shows details of a rotary nozzle; and

Fig. 3 is a plan view parts being broken away of a nozzle plate on which the nozzle is mounted.

Throughout the drawings like reference characters indicate like parts. 12 is a portion of an underground system of sewage mains, terminating in an upward bend 13 having a connecting flange 24 to which a flexible pipe 23, serving as the intake to a pump 22, may be detachably connected. Said pump is preferably mounted on a wheeled vehicle 21, and 25 is a motor, preferably an electric motor, mounted on the vehicle to drive the pump 22. Under certain conditions the motor that drives the vehicle may also be arranged to drive the pump. The pump 22 will usually have an output of about 5 cubic meters per minute. From the short discharge pipe 26 on the pump a pressure pipe 28, which is preferably movable, leads to an upright pipe 30 which is fitted at its top end with a head 31 equipped with a nozzle 32 which is preferably inclined to the horizontal plane at an angle of 30° to 35°. The head 31 is provided with a circle of teeth 33 that engage with a pinion 34 adapted to be rotated by means of a shaft 35. The shaft 35 may be operated by hand, but is preferably rotated through suitable gear, as diagrammatically illustrated, by the motor 25 that drives the pump 22 so that during the operation of the pump the nozzle 32 turns slowly around the pipe 30 at a rate of say 3 revolutions per minute. The joint between the head 31 and the end of the pipe 30 is made water-tight by means of a packing device 36 and a stuffing box 37, and an outwardly projecting ring 38 formed by two abutting flanges keeps the head in its place so as to prevent it from being forced off by the pressure of the water. Ball bearings 39 are preferably provided between the pressure ring 38 and the abutting rings 40 connected to the circle of teeth 33.

The pipe 30 with the nozzle 32 is preferably not mounted directly on the vehicle 21 but upon a separate bed plate 41. 42 43 is a ball and socket joint which supports one end of the supporting plate 41. A spring 44 acts on the opposite end of the plate at 45 and tends to draw the same downward. Arranged between the plate 41 and the bottom vehicle plate is a horizontal shaft 46 which, like the shaft 35 may be rotated, through any suitable driving connection as indicated in the drawing, by the motor 25 that drives the pump. The shaft 46 is preferably caused to execute about 30 revolutions per minute. At its opposite ends the shaft 46 is provided with cams 47, 48 which are radially displaced with respect to each other and act upon the bottom surface of the plate 41 at two different points. The cam shaft 46 rotates during the operation of the motor 25 and the pump so that the cams 47', 48 alternately incline the plate 41 and the nozzle carrying pipe 30 mounted upon it. The plate 41 with the pipe 30 and the nozzle 31 are thus caused to execute oscillatory movements so that the elevation of the jet ejected from the nozzle 32 will be continually altered and the water squirted to a farther or lesser distance so as to describe intersecting serpentine lines around a central point.

The operation of the watering plant is as follows:

By any convenient closure means (not shown) the mouths of all the upright portions 13 of the sewage distributing system of pipes are always closed with the exception of the one to which the pump 22 is connected with the aid of a pipe 23. When the motor 25 operates the pump, the latter draws water from the pipe 13 and presses it through the pipe 28 into the pipe 30 and the head 31, from which latter it is ejected through the nozzle 32 at a high speed. While the water is thus being ejected the nozzle head 31 is rotated slowly with the nozzle 32 by the shaft 35 so that the jet describes a sinuous path around the pipe 30. The dimensions of the parts are arranged in accordance with the laws of hydraulics so that the distance to which the jet is thrown is such that the circular surfaces which the jet is capable of covering from each ascension pipe 13 overlap each other, and there will be no part of the field that cannot be reached by the jet.

The rotation of the jet around the pipe 30 is accompanied, as already indicated above, by oscillations of the pipe 30 caused by the action of the cams 47 and 48 on the supporting plate 41. By this means the inclination of the nozzle 32 to the horizontal is continually varied and the distance of travel of the jet is varied accordingly. By this means the circular area watered with the pump stationed at any point also includes the part of the field in the immediate neighbourhood of the pump or of the point of issue of the jet.

In order to still further improve the distribution of the water over the field, posts 49 can be arranged on the deck 29 of the vehicle which carry one or more ring-shaped water-distributing members 50, 51 against which the jet leaving the nozzle 32 strikes when a certain inclination of the jet is reached. When the angle of inclination has been increased to a certain extent the jet strikes against the sharp edges of the one or the other ring 50 or 51 and is thus diverted and distributed in a manner similar to the diversion of a jet by the blades of a turbine, so that the jet is thrown a shorter distance and the central parts of the circular area to be watered are reached by the jet. At suitable points the rings 50, 51 can be held together by means of sharp-edged ties 53 of wedge-shaped cross section.

An obvious further advantage of this construction results from the fact that the issuing stream is divided into two sections (one upper and one lower) by the knife-like action of whichever ring 50 or 51 is struck by it, and that these divided streams have different radii of distribution, thus dispersing the water over larger areas, and also without any backward spattering action on the apparatus itself or on the operator thereof.

While in the particular embodiment of the invention here shown the rings 50, 51, are shown as fixed and the nozzle is raised and lowered, all that is necessary to effect the desired result is that the relative positions of rings and nozzle be varied in a vertical direction during operation of the apparatus.

With a pump which delivers 5 cubic meters a minute at a pressure of 4 atmospheres in the pressure pipe 30, a jet of a diameter of 70 mm. issuing from the nozzle 32 inclined at about 32° to the horizontal will be thrown to a distance of 65 to 70 meters, so that the area which can be watered from a single point is about 2½ acres in extent. At a delivery of 5 cubic meters of water per minute this surface receives about 0.2 inches of rain in ten minutes.

Instead of varying the range of the jet from the nozzle 32 by altering the inclination of the pipe 30 and instead of providing distributing rings 50, 51, the variation of the range of the jet could be effected by means of a throttle valve 60 in the connecting pipe between the ascension pipe 13 and the nozzle pipe 30. The throttling effect of the valve 60 could be changed periodically by means of an arm 61 moved to and fro by suitable gear, and a rod 63 driven by the pump motor, as indicated diagrammatically in the drawing.

The current supply to the pump motor is preferably effected by means of line wires carried on poles placed in suitable positions on the field to be watered. The connections between the pump motor and the electric supply mains are preferably effected by placing a pole adjacent each ascension pipe and by securing at a convenient height on the pole terminals to which the wires from the motor can be connected by a connecting device adapted to be hooked onto the terminals. The connecting device and the terminals are constructed so as to enable the connection to be readily performed by merely hooking the connecting device onto the terminals without any danger of the operator coming into contact with conducting parts. In order to make the electrical part of the equipment as cheap as possible a high tension, say a 2000 volt three phase system may be employed.

I claim:

1. A field watering plant having, in combination, a rotatable fluid discharging nozzle adapted, when rotated, to distribute a jet of fluid circumferentially around it, means for rotating said nozzle about a substantially vertical axis, means for raising and lowering said nozzle, and a ring-shaped jet-spreading device surrounding the axis of rotation of said nozzle, said spreading device being located in the path of the jet of fluid discharged therefrom at one point in the vertical movement of said jet.

2. A combination such as defined in claim 1 in which said jet spreading device comprises a ring having a V-shaped cross section forming a circumferential knife edge on the inner face of said ring and facing said jet.

3. A field watering plant having, in combination, a rotatable fluid discharging nozzle adapted, when rotated, to distribute a jet of fluid circumferentially around it, means for rotating said nozzle about a vertical axis, and a ring-shaped jet spreading device substantially concentric with the axis of rotation of said nozzle, together with mechanism operably connected to said means for rotating said nozzle adapted to vary the relative vertical positions of said nozzle and said spreader with reference one to another, whereby during certain periods of each cycle of rotation of said nozzle the jet discharged therefrom will strike said spreader device.

4. A combination such as defined in claim 3 in which said jet spreading device comprises a ring having a V-shaped cross section forming a circumferential knife edge on the inner face of said ring and facing said jet.

5. A field watering plant having, in combination, a fluid discharging nozzle inclined to the horizontal plane with its discharge end uppermost and capable of rotation about a substantially vertical axis passing through its lower portion, means for rotating said nozzle about said axis, an annular jet spreading device concentric with said axis and means for causing the jet of fluid discharged from said nozzle to impinge on said spreader during certain periods of operation.

6. A combination such as defined in claim 5 in which said spreading device comprises a plurality of rings each of V-shaped cross section with the apex of the V directed toward said nozzle.

In testimony whereof I affix my signature.

ALPHONS HORTEN.